United States Patent
Yang et al.

(10) Patent No.: US 7,120,989 B2
(45) Date of Patent: Oct. 17, 2006

(54) PROCESS OF MANUFACTURING A PERPENDICULAR MAGNETIC POLE STRUCTURE

(75) Inventors: Danning Yang, Fremont, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 333 days.

(21) Appl. No.: 10/781,168

(22) Filed: Feb. 18, 2004

(65) Prior Publication Data

US 2005/0177996 A1    Aug. 18, 2005

(51) Int. Cl.
G11B 5/127    (2006.01)
B05D 1/32    (2006.01)
B44C 1/22    (2006.01)

(52) U.S. Cl. ............... 29/603.12; 29/603.11; 29/603.16; 29/603.18; 360/126; 427/282; 216/22; 216/44; 451/36

(58) Field of Classification Search ..............
29/603.11–603.18, 603.07, 603.08; 451/36, 451/41; 360/119, 122, 125, 126; 216/22, 216/41, 44, 52; 427/127, 129, 282, 407.1; 438/589; 51/307, 308
See application file for complete search history.

(56) References Cited

U.S. PATENT DOCUMENTS

| 5,972,787 | A | 10/1999 | Boggs et al. | 438/633 |
|---|---|---|---|---|
| 6,024,886 | A | 2/2000 | Han et al. | 216/38 |
| 6,063,306 | A | 5/2000 | Kaufman et al. | 252/79.4 |
| 6,063,699 | A * | 5/2000 | Hanafi et al. | 438/589 |
| 6,226,149 | B1 | 5/2001 | Dill, Jr. et al. | 360/126 |
| 6,416,677 | B1 * | 7/2002 | Wei et al. | 216/22 |
| 6,554,878 | B1 | 4/2003 | Dill, Jr. et al. | 51/308 |

FOREIGN PATENT DOCUMENTS

JP    57-113411    *    7/1982    ............. 216/22

OTHER PUBLICATIONS

Oyama et al., "Planar Yoke Write Head for Half-Micron Track Width", IEEE Transactions on Magnetics, vol. 36, No. 5, Sep. 2000, pp. 2509-2513.*

* cited by examiner

*Primary Examiner*—A. Dexter Tugbang
(74) *Attorney, Agent, or Firm*—Saile Ackerman LLC; Stephen B. Ackerman

(57) ABSTRACT

For PMR (Perpendicular Magnetic Recording) design, one of the major technology problems is the use of CMP to fabricate the pole structure. If the device is under-polished there is a danger of leaving behind a magnetic shorting layer while if it is over-polished there may be damage to the main pole. This problem has been overcome by surrounding the main pole, write gap, stitched write head pillar with a layer of CMP etch stop material which, using optical inspection alone, allows CMP (performed under a first set of conditions) to be terminated just as the stitched write head gets exposed. This is followed by a second CMP step (performed under a second set of conditions) for further fine trimming of the stitched head, as needed.

11 Claims, 5 Drawing Sheets

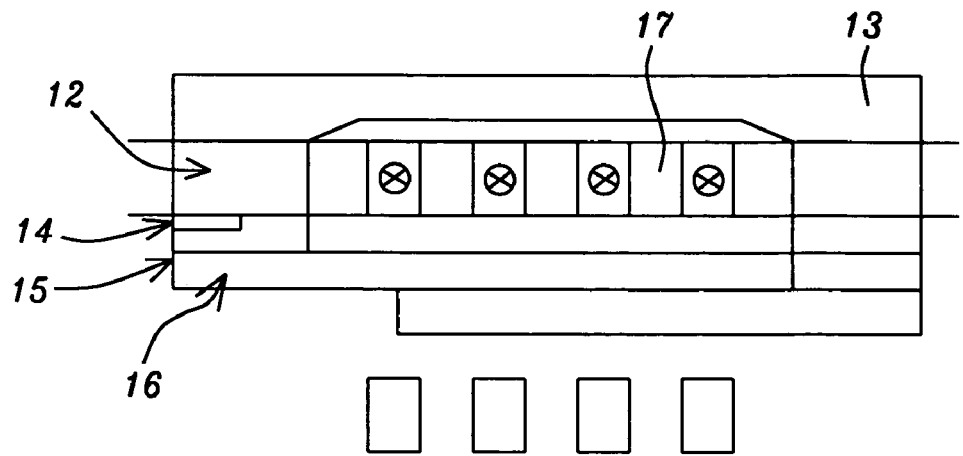
FIG. 1 – Prior Art
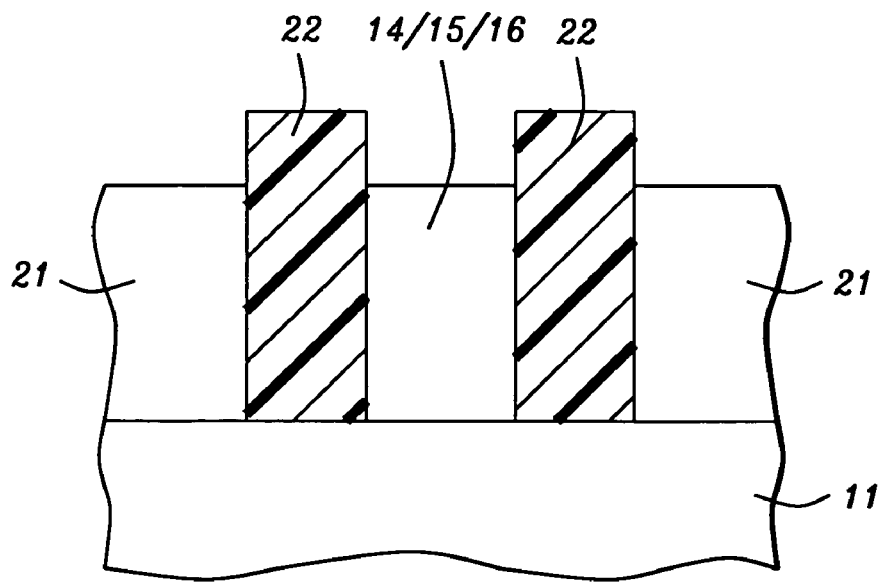
FIG. 2 – Prior Art

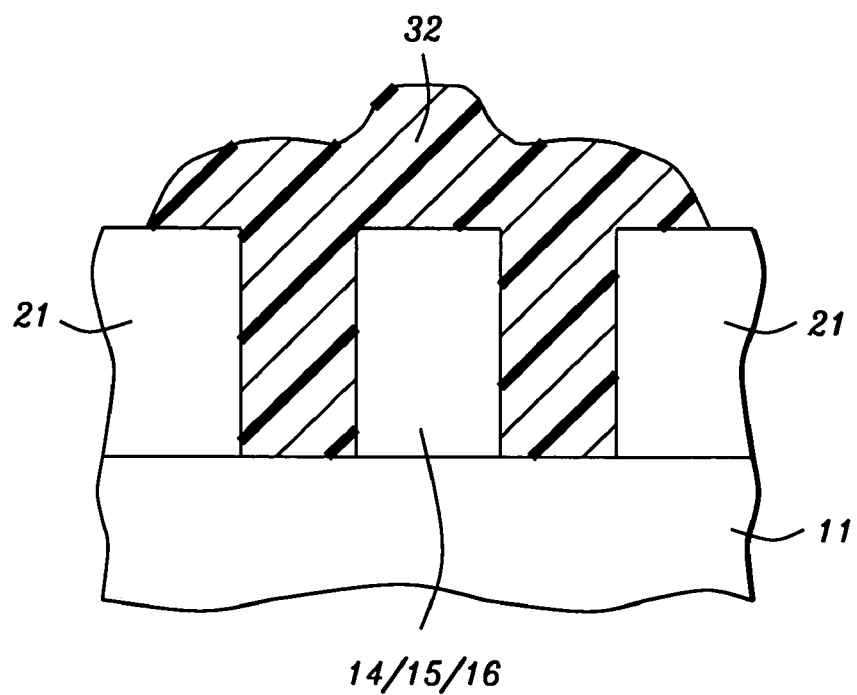
FIG. 3 – Prior Art
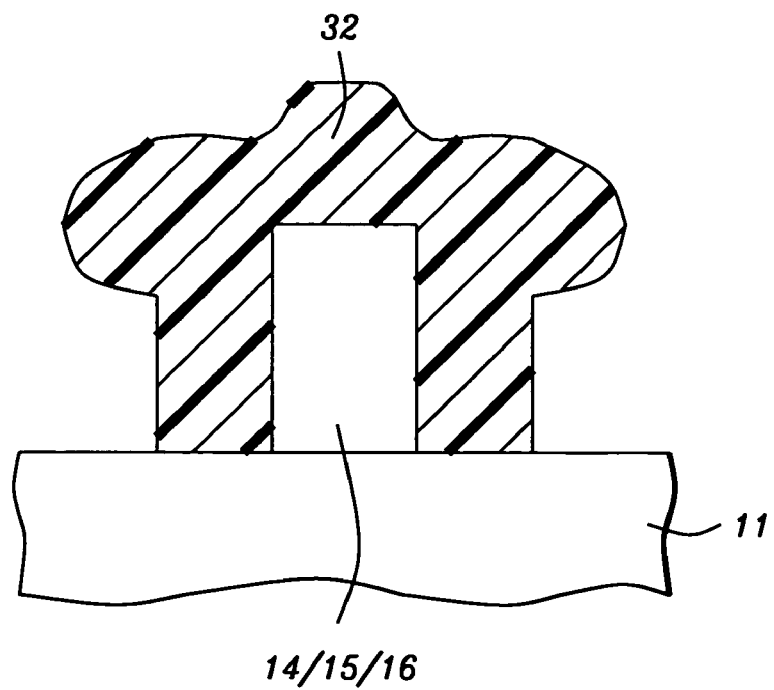
FIG. 4 – Prior Art

PROCESS OF MANUFACTURING A PERPENDICULAR MAGNETIC POLE STRUCTURE

FIELD OF THE INVENTION

The invention relates to the general field of magnetic write head manufacture with particular reference to main pole trimming.

BACKGROUND OF THE INVENTION

During PMR (Perpendicular Magnetic Recording) manufacture it becomes necessary to polish all the magnetic materials away after PPT (partial pole trim) on top of the yoke area. The CMP (chemical mechanical polishing) process must be well controlled in such cases since a magnetic shorting path will be present if under-polish occurs while, on the other hand, the main pole will be damaged if excessive over-polish takes place.

Typically, before polish, one is faced with a stack of metal films covered by a full film of alumina. In this context, the goal of properly executed CMP (Chemical Mechanical Polishing) is to stop at a particular layer that is in the middle of whole stack of other layers so it becomes a critical and challenging task to monitor and control the CMP process in order to make a PMR head successfully.

Referring now to FIG. 1 we show there an example of a magnetic write head that includes a main pole 16, a non-magnetic write gap 15, and a stitched write shield 14, which together surround the coil area 17. Located atop 14 are first and second write shields 12 and 13 respectively. All subsequent figures will be ABS (air bearing surface) views i.e. in the direction shown by arrow 18.

For PMR design, one of the major technology problems is the use of CMP to fabricate the pole structure. Since plated magnetic materials are part of the structure, they must be removed completely at he conclusion of CMP. The prior art CMP process is shown as below, but, as will be seen, one encounters several unique difficulties when doing so.

As seen in FIG. 2, the PMR structure before polishing includes metal stack 14/15/16, which was formed inside photoresist mold 22, as well as field area 21 (made pf magnetic material). The CMP final target is to be stopped at a desired metal interface. If under-polish occurs, a magnetic shorting path will be present. On the other hand, the main pole will be damaged if over-polish occurs. Thus to maintain high yields of functional devices, CMP must be well controlled both in terms of uniformity as well as precise termination when some desired metal layer is reached.

As seen in FIG. 3, once the device and field areas have been formed, photoresist mold 22 is removed and replaced with photoresist layer 32 which extends outwards from the device so as to partially cover field area 21 as well. In this way, device pedestal 14/15/16 is all that remains.

It follows from the above that a monitoring scheme must be provided in order to control the CMP process tightly. However, requiring the CMP process to stop at a middle layer is completely contrary to traditional magnetic head CMP practice. FIB (focused ion beam) is commonly utilized in wafer processing to cut devices and to check where CMP stopped. This has several disadvantages: (1) very expensive due to long off-line cycle time and possible permanent damage the device (2) limited sample size (3) a high quality FIB image is obtained only if the stopping layer shows high contrast relative to other materials under removal by the ion beam which, for most applications, is not the case.

In other words, monitoring and controlling a CMP process in order to make PMR head successfully is a critical and a challenging task.

A routine search of the prior art was performed with the following references of interest being found:

In U.S. Pat. No. 6,063,306, Kaufman et al. disclose two slurries having different selectivities for copper and tantalum. In U.S. Pat. No. 6,554,878, Dill, Jr. et al. show different slurries to polish different materials, including alumina. Boggs et al. describe indicator areas on a wafer to check CMP results in U.S. Pat. No. 5,972,787 and in U.S. Pat. No. 6,226,149, Dill, Jr. et al. disclose the use of CMP in forming a pole while in U.S. Pat. No. 6,024,886, Han et al. teach a CMP process using a polish stop layer.

SUMMARY OF THE INVENTION

It has been an object of at least one embodiment of the present invention to provide an improved process for trimming the stitched write shield of a magnetic read head.

Another object of at least one embodiment of the present invention has been to be able to skip the field etch step used in the prior art.

Still another object of at least one embodiment of the present invention has been to be able to precisely trim the stitched write shield without damaging the main pole.

A further object of at least one embodiment of the present invention has been to provide a method, suitable for in-line use during full wafer production, to terminate CMP at precisely a desired level.

These objects have been achieved by using a plated hard mask to etch out the main pole, write gap, and stitched write shield. The resulting pillar is surrounded by a layer of CMP etch stop material, such as Ru or Ta, which, using optical inspection alone, allows CMP (performed under a first set of conditions) to be terminated just as the stitched write head gets exposed. This is followed by a second CMP step (performed under a second set of conditions) for further fine trimming of the stitched head, as needed.

BRIEF DESCRIPTION OF THE DRAWINGS

FIG. 1 is a cross-sectional view of a typical write head showing, in particular, the main pole and stitched write shield (separated by the write gap).

FIGS. 2–4 (these, and all subsequent figures, being ABS views) show how pole trimming was achieved in the prior art.

DESCRIPTION OF THE PREFERRED EMBODIMENTS

Figure 5:
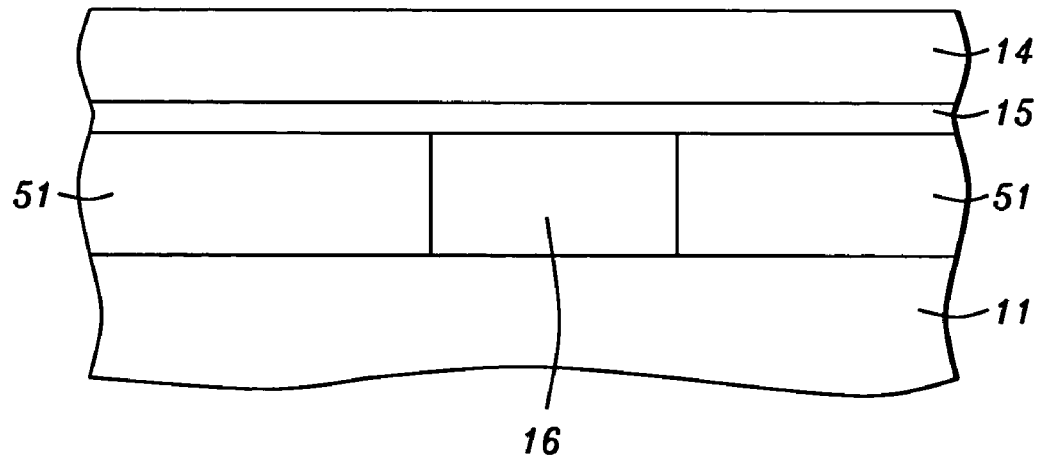
FIG. 5 shows the starting point for the process of the present invention.

In order to control CMP uniformity for this application, several process sequences have been modified:

(1) The field etch process (FIG. 4) is skipped in order to have better topology across the whole wafer before polish. Field etch is commonly implemented right after electro-deposition of pole materials, and then the pole trimming process begins. As a result, the topology across the whole wafer varies considerably between field area and device area due to different etch rates for different materials. Additionally the dense metal features are separated quite far apart by areas of sputtered $Al_2O_3$ which does not favor CMP uniformity control.

(2) For the present invention, we Insert a barrier layer in the middle of metal film stack and then two different, highly selective slurries are employed in two separate steps during CMP. In order to make the process stop at a desired metal layer in a film stack, we incorporate either Ru or Ta into the film stack. CMP begins with the first slurry which cuts $Al_2O_3$ much faster than it does the magnetic film. After this step, the remaining metal thickness mainly depends on the plating and IBE process. Once all the magnetic materials are exposed, the second slurry, which has high selectivity for magnetic materials relative to Ru or Ta is introduced to remove bulk metal full film until the Ru (or Ta) is reached. Thus, all magnetic materials on top of the yoke will be removed with no significant damage of pole structure.

(3) To effect step (2), monitoring sites are provided around every device to check if the barrier layer has been reached. This offers an efficient on-line scheme to control the CMP process since the point at which the desired layer is reached during CMP may be checked by using only an optical microscope. As a result, the process can be efficiently run in a production environment.

(4) CMP Process (i) Above all, the wafer process has been much simplified by skipping the field etch. Most of the field areas and device areas are at a similar level when processed according to the present invention. Therefore "peaks" and "valley" are uniformly distributed across the whole incoming wafer. Additionally, by using the slurry MH-881 in the first polishing step, the plated CoNiFe in the field area acts as a natural stop because the slurry removes $Al_2O_3$ much faster. This facilitates subsequent control of the uniformity of the remaining magnetic film because the majority of CMP variation with metal thickness is eliminated during this step;

(ii) Use of two slurries with high selectivities for CoNiFe/ $Al_2O_3$ and CoNiFe/Ru(Ta) also improves CMP process control with respect to uniformly stopping polishing at a barrier layer. The second slurry, MH-814, removes CoNiFe and $Al_2O_3$ much faster than Ru/Ta after all magnetic films are exposed. Therefore an over-polishing 'window' is opened which allows one to clean all CoNiFe from on top of the yoke across the whole wafer without breaking into any desired layers.

(iii) This invention teaches a monitoring test sites scheme around devices and overcomes all the disadvantages, discussed above) if FIB is employed to monitor the CMP process. First, the exposure check can be done on-line in real time to save wafer processing time; secondly there are four monitoring sites around every devices for sample size consideration; thirdly it is very easy to see if the desired barrier layer has been reached, even if the barrier and removal layers have limited optical contrast. This is because the $Al_2O_3$ is transparent so one can look through it down to substrate. An additional advantage of this process is that as a larger fraction of the barrier layer material becomes exposed they acting to further improve CMP process uniformly.

Referring now to FIG. 5, we begin an overview description of the process of the present invention. The process begins with the provision of substrate 11 (which in practice would be $Al_2O_3$) on which magnetic disk 16 is formed and then abutted with layer of insulation 51 (for which suitable materials include $Al_2O_3$ and $SiO_2$. Magnetic disk 16 is a material such as CoFeN, CoFe, or CoNiFe and it is between about 0.2 and 0.4 microns thick. This is followed by the deposition of non-magnetic write gap layer 15 (made of materials such as $Al_2O_3$, $SiO_2$ or Ru and deposited to a thickness between about 500 and 1,000 Angstroms) onto the coplanar surfaces of 51 and 16. Then, magnetic layer 14 (which will later become the stitched write shield) is deposited onto layer 15. Layer 14 is a material such as CoFeN or CoFe and it is between about 3,000 and 5,000 Angstroms thick.

Figure 6:
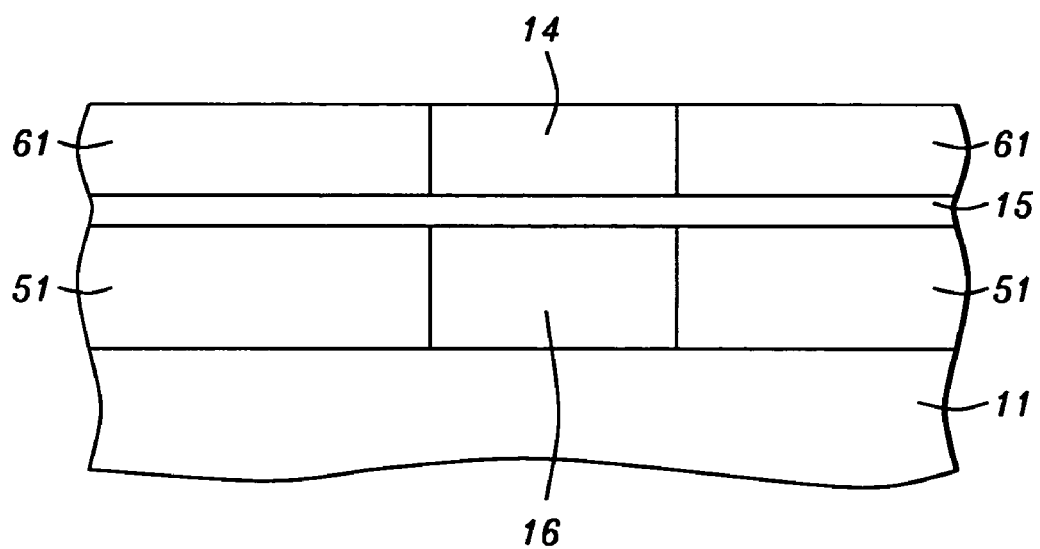
FIG. 6 shows how the main pole, write gap, and stitched write shield layers are formed.
Figure 7:
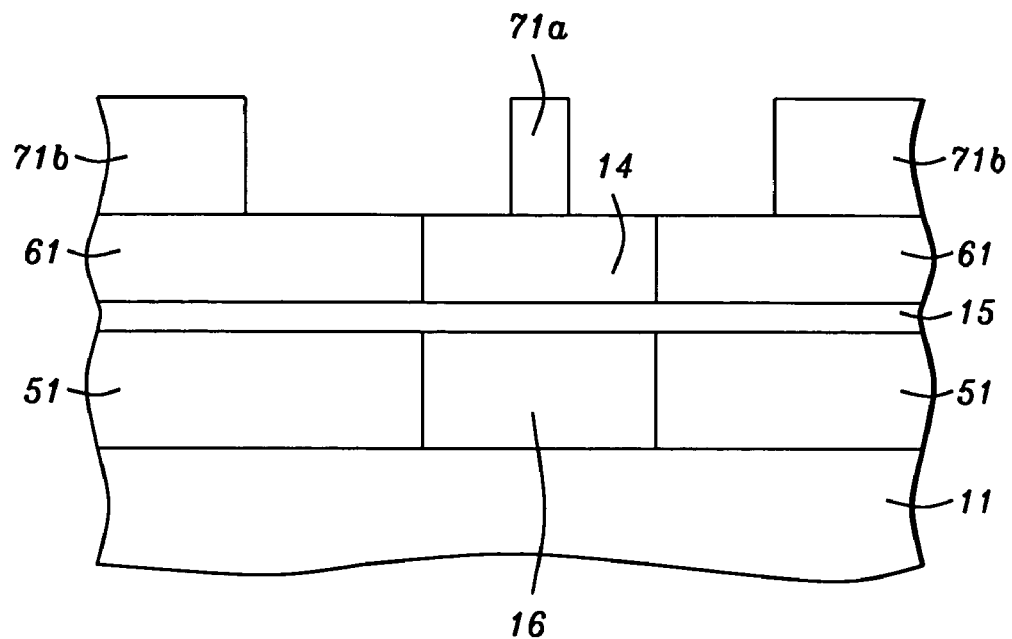
FIG. 7 illustrates the hard mask that is used to define the read head stack.

Referring next to FIG. 6, magnetic disk 14 is formed out of layer 14 and then abutted by end point detection layer 61, said layers having coplanar top surfaces on which hard mask 71 is formed (FIG. 7). The process for forming the hard mask involves first laying down a photoresist mold (similar to mold 22 in FIG. 2) and then electro-depositing the hard mask material onto all unprotected surfaces, following which the photoresist mold is removed. The resulting hard mask has two main parts—a central portion 71a that defines the shape and position of the stitched write shield 14 and the main pole 16 (see FIG. 1) and a surrounding portion 71b to limit the size of layer 61.

Figure 8:
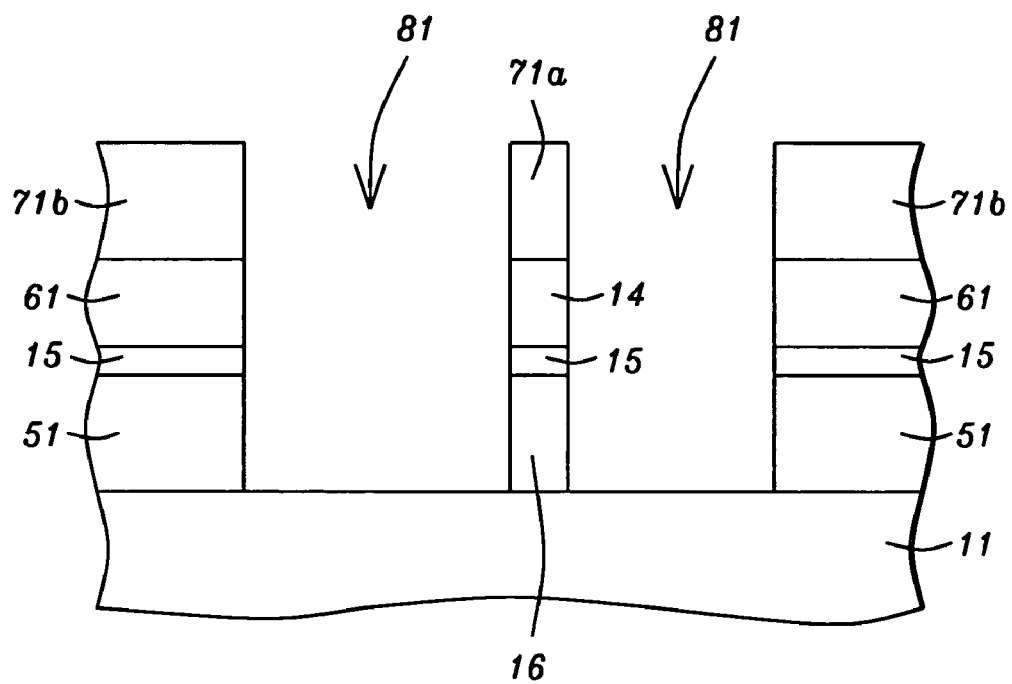
FIG. 8 shows the structure after etching down as far as the substrate level.
Figure 9:
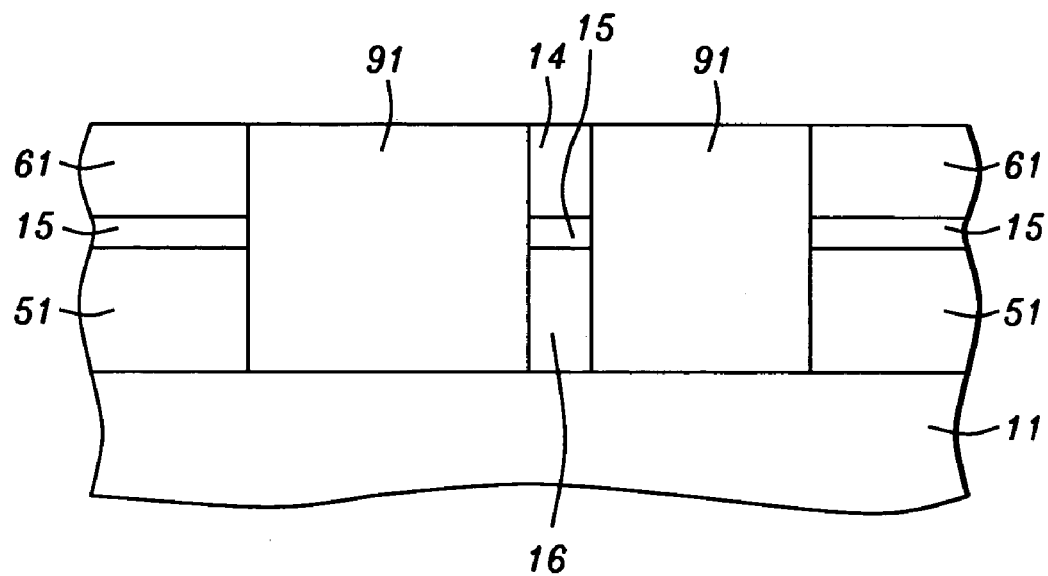
FIG. 9 illustrates how CMP may be terminated precisely at the point when the stitched write head is exposed.

Moving now to FIG. 8, all material not covered by the hard mask is then removed down as far as substrate 11, thus forming cavity 81 which is overfilled with insulating layer 91 (a material such as $Al_2O_3$ or $SiO_2$). This is followed by the first of two CMP steps discussed earlier in which CMP proceeds until the end point detection layer which acts as an etch stop layer 61 is just exposed, the exact point at which to terminate CMP being determined through optical inspection of layer 61. The precise exposure of layer 61 also leads to the simultaneous exposure of layer 14 so there is no danger of over-polishing the stitched write shield, as illustrated in FIG. 9. The first CMP step further comprises: using a slurry of 2–5 weight % alumina, with 93–96 weight % deionized water, at a pH of about 7.5 to 8.5; applying a back pressure –6 and 6 p.s.i.; having a wafer rotation speed about 50 and 70 r.p.m.; exerting a wafer polish pressure between about 4 and 6 p.s.i.; and including less than about 2% additives by weight.

Figure 10:
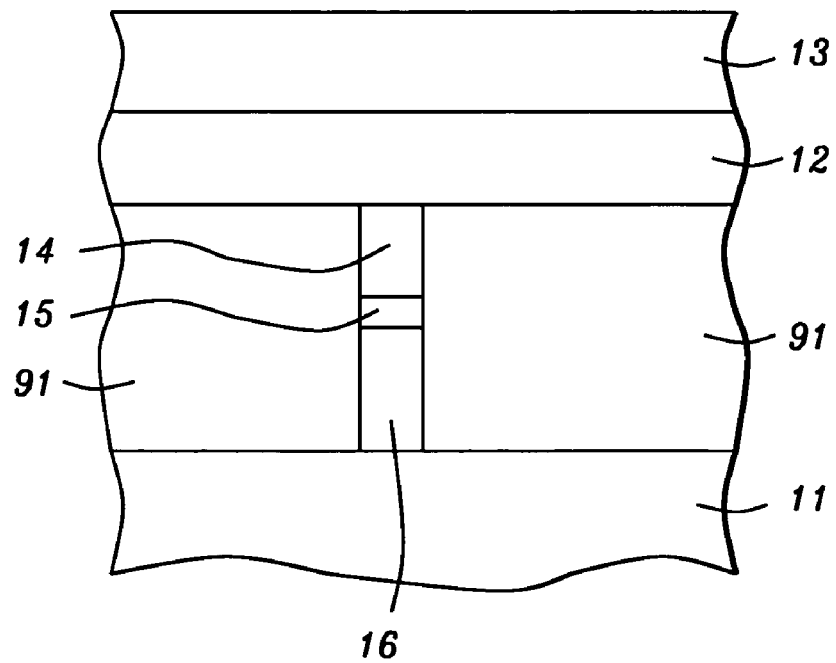
FIG. 10 illustrates the completed structure, including the two upper write shields.

The structure is now ready for the final trimming of stitched write shield 14 which is accomplished using the second of the two afore-mentioned CMP steps until the desired final thickness is reached. As shown in FIG. 10, the process concludes with the deposition of first and second write shields, 12 and 13 respectively, on layer 91 and 14. The second CMP step further comprises: using a slurry of 2–7.8 weight % alumina, with 90–95 weight % deionized water, at a pH of about 4 to 4.8; applying a back pressure between –6 and 6 p.s.i.; having a wafer rotation speed between about 50 and 70 r.p.m.; exerting a wafer polish pressure between about 4 and 6 p.s.i.; and including less than about 3% additives by weight.

In summary, the present invention provides:

(1): a simplified process sequence by skipping field etching and its associated photo processes;

(2): a well controlled CMP process is achieved by using either Ta or Ru as a barrier layer;

(3): an accurate monitoring method is provided for polishing a full wafer.

What is claimed is:

1. A process to form a magnetic write head, including a stitched write shield and a main pole comprising:
   forming a first magnetic disk on a substrate and abutting said first magnetic disk with a first layer of insulation with which the first magnetic disk and the first layer of insulation each share a first common top surface;
   depositing a non-magnetic write gap layer on said first common top surface;
   forming on said write gap layer a second magnetic disk and abutting said second magnetic disk with an end point detection layer with which the second magnetic disk and the end point detection layer each share a second common top surface;
   forming on said second common top surface a hard mask that defines, within said magnetic disks, the stitched write shield and main pole;
   then removing all material not covered by the hard mask down as far as said substrate, thereby forming a cavity;
   overfilling said cavity with a second layer of insulation and then performing a first CMP step until said end point detection layer is just exposed, thereby also just exposing said second magnetic layer and thus forming thereform said stitched write shield; and
   then performing a second CMP step until said stitched write shield has been given a desired thickness.

2. The process recited in claim 1 wherein said first magnetic disk is selected from the group consisting of CoFeN, CoFe, and CoNiFe.

3. The process recited in claim 1 wherein said second magnetic disk is selected from the group consisting of CoFeN, CoFe, and CoNiFe.

4. The process recited in claim 1 wherein said first layer of insulation is selected from the group consisting of $Al_2O_3$ and $SiO_2$.

5. The process recited in claim 1 wherein said second layer of insulation is selected from the group consisting of $Al_2O_3$ and $SiO_2$.

6. The process recited in claim 1 wherein the step of forming the hard mask further comprises:
   forming a photoresist mold on said second common top surface;
   electro-depositing material on all conductive surfaces not covered by said mold; and
   then selectively removing said mold.

7. The process recited in claim 1 wherein the first CMP step further comprises:
   using a slurry of 2–5 weight % alumina, with 93–96 weight % deionized water, at a pH of about 7.5 to 8.5;
   applying a back pressure between about −6 and 6 p.s.i;
   having a wafer rotation speed between about 50 and 70 r.p.m;
   exerting a wafer polish pressure between about 4 and 6 p.s.i; and
   including less than about 2% additives by weight.

8. The process recited in claim 1 wherein the second CMP step further comprises:
   using a slurry of 2–7.8 weight % alumina, with 90–95 weight % deionized water, at a pH of about 4 to 4.8;
   applying a back pressure between about −6 and 6 p.s.i;
   having a wafer rotation speed between about 50 and 70 r.p.m;
   exerting a wafer polish pressure between about 4 and 6 p.s.i; and
   including less than about 3% additives by weight.

9. The process recited in claim 1 wherein said desired stitched write shield thickness is between about 0.3 and 0.5 microns.

10. The process recited in claim 1 wherein said non-magnetic gap layer is selected from the group consisting of $Al_2O_3$ and Ru.

11. The process recited in claim 1 wherein said non-magnetic gap layer is deposited to a thickness between about 500 and 1,000 Angstroms.

* * * * *